United States Patent [19]

Kawauchi et al.

[11] Patent Number: 4,561,481
[45] Date of Patent: Dec. 31, 1985

[54] TIRE RIM STRUCTURE AND METHOD OF MANUFACTURE

[75] Inventors: Kazunori Kawauchi, Kanazu; Junichi Sato, Kaga, both of Japan

[73] Assignee: Daido Kogyo, Co., Ltd., Ishikawa, Japan

[21] Appl. No.: 651,645

[22] Filed: Sep. 17, 1984

Related U.S. Application Data

[62] Division of Ser. No. 384,322, Jun. 1, 1982, abandoned.

[30] Foreign Application Priority Data

Jun. 11, 1981 [JP] Japan .................................. 56-90048

[51] Int. Cl.⁴ ............................................. B60B 21/00
[52] U.S. Cl. ................... 152/379.3; 152/379.5; 152/384; 301/97; 29/159.1
[58] Field of Search ............. 29/159 R, 159.1, 159.01, 29/159.02, 121.1; 72/253.1, 256, 703; 152/379.3, 379.5, 381.3, 384, DIG. 17; 301/97, 98

[56] References Cited

U.S. PATENT DOCUMENTS

| 2,034,360 | 3/1936 | Sill | 301/97 |
| 2,345,993 | 4/1944 | Sinclair | 29/159.1 |
| 2,379,718 | 7/1945 | Jensen | 72/703 X |
| 2,577,423 | 12/1951 | Ludwig et al. | 72/703 X |
| 4,190,092 | 2/1980 | Evans et al. | 301/97 X |

FOREIGN PATENT DOCUMENTS

133876  6/1947  Australia .................. 301/97

*Primary Examiner*—Randolph A. Reese
*Assistant Examiner*—Russell D. Stormer
*Attorney, Agent, or Firm*—Wenderoth, Lind & Ponack

[57] ABSTRACT

A tire rim structure and method of manufacture in which rows of sharply edged or pointed projections are integrally provided on the ear portions or bead seat portions of the rim. In accordance with the preferred embodiments of the invention, the projections may be pyramid shaped, triangular prism shaped or sawtooth shaped. The projections may be formed by applying a triangularly toothed roller or a grinding device to elongated ridges formed on the tire rim during an otherwise conventional extrusion process for obtaining a smooth tire rim.

8 Claims, 11 Drawing Figures

TIRE RIM STRUCTURE AND METHOD OF MANUFACTURE

This application is a division, of now abandoned application Ser. No. 384,322, filed June 1, 1982, now abandoned.

BACKGROUND OF THE INVENTION

1. Field of the Invention

The invention relates to a tire rim and more particularly to aluminum alloy tire rims having tire-slip stoppers used on motorcycles and a method of manufacture thereof.

2. Description of the Prior Art

Prior motorcycle tire rims are provided with many indentations on the inside surfaces 1a of the ear portions thereof, as shown for example in FIG. 1. The indentations or grooves 2 are intended to prevent the tires from slipping on the rim 1, which can lead to loss of wheel traction and separation of the tire from the rim when the tire is punctured. In accordance with prior rim designs, the indentations are arranged in various directions and positions on the rim surface. For example, the radially extending indentations 2 illustrated in FIG. 1 are disclosed in Japanese published examined utility model application No. 32-1002. Japanese published examined utility model application No. 31-4603 discloses circumferentially directed indentations in a tire rim. Obliquely crossed indentations on the tire rim are disclosed in Japanese published utility model application No. 40-1603. Indentations on the surfaces of the bead portions 1b of the rim are disclosed in Japanese published examined utility model application No. 35-7627. These prior art slip-inhibiting indentations are press shaped by rollermolding on flat material surfaces. But the indentations 2 press-shaped by this technique, which have a depth d and are illustrated in FIG. 2, are relatively shallow and the indented area A of the tire rim ear portions or bead seat portions is relatively smooth. It should be noted that these indentations 2 are indented shallowly on the inside wall of each tire rim ear portion which confronts with each other at a distance W equivalent to a space between the outsidewall of tire beads, or on the bead seat portions with the width equivalent to a radius of tire bead. Therefore the tire bead wouldn't bite sufficiently into these indentations. A problem with these prior art rims has been discovered in recent years as the use of motorcycles under stressful conditions has increased, as for example, with the increased popularity of motorcross racing. Under such conditions, the slip-inhibiting indentations of the prior art have been found to have insufficient bite to prevent tire slipping. This slipping, which leads to loss of traction and can result in tire separation in the event of a puncture, is particularly dangerous during hard driving conditions, when the motorcyclist is particularly vulnerable to a serious injury in the event of loss of control of his motorcycle.

It is therefore an object of the present invention to provide a tire rim which prevents tire slippage even under hard driving conditions.

It is also an object of the invention to provide a tire rim for motorcycles, having tire-slip stoppers which bite into the wall of the tire to prevent slippage.

It is still another object of the invention to provide an accurate and inexpensive method of manufacture of an aluminum alloy tire rim having tire slip stoppers integral with the rim projecting in rows from the rim surface.

SUMMARY OF THE INVENTION

In accordance with the invention there is provided in a tire rim having a concave inner portion and bead seat and ear portions outside the concave inner portion, and a generally smooth surface generally in the shape of the exterior surface of a tire to be mounted thereon, at least two circumferentially directed rows of protrusions (projections) extending outwardly of and integrally with the surface of the rim for gripping the tire to prevent slippage. In accordance with various embodiments of the invention, the projections may be pyramid shaped or triangular prism shaped, may extend in rows part way or all around the circumference of the tire, and may be formed on the ear portions of the rim or the bead seat portions of the rim.

In accordance with a method of manufacture in accordance with the invention, the above-described tire rims are produced by extruding and bend-rolling aluminum alloy tire rim shaped articles having continuous elongated ridges formed on the surfaces of the ear and/or bead seat portions thereof and notching the ridges with a toothed roller to form a finished integral tire rim having rows of projections for biting into the tire to be mounted thereto to prevent tire slippage.

BRIEF DESCRIPTION OF THE DRAWINGS

These and other objects, features and advantages of the invention will be further understood from the following detailed description of preferred embodiments of the invention and the accompanying drawings in which:

FIG. 6a is a perspective view of projections formed on a tire rim in accordance with a second embodiment of the present invention;

FIG. 6b is a plan view of the projections shown in FIG. 6a;

FIG. 7 is a perspective view illustrating the method of the present invention;

FIG. 8 is a cross-sectional view of a third embodiment of the tire rim of the present invention; and FIG. 9 is a cross-sectional view of a fourth embodiment of the tire rim of the present invention.

DETAILED DESCRIPTION OF THE PREFERRED EMBODIMENT

Figure 1:
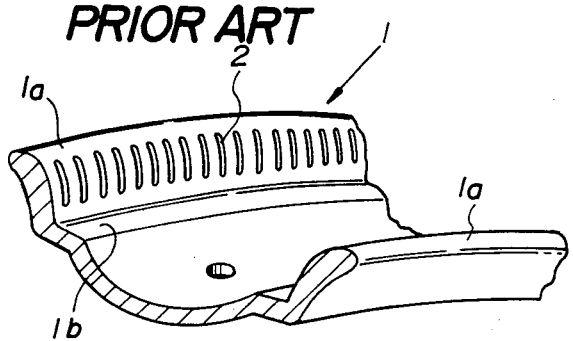
FIG. 1 is a perspective view of a portion of a conventional tire rim with conventional tire-slip retarding indentations formed therein.
Figure 2:
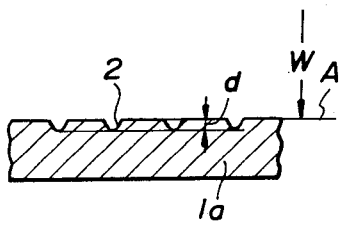
FIG. 2 is a cross-sectional view of the rim shown in FIG. 1.
Figure 4:
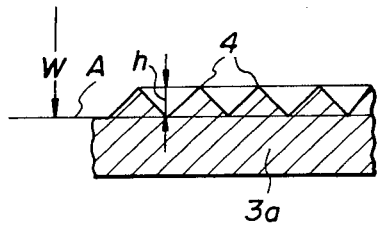
FIG. 4 is an enlarged cross-sectional view of the projections of the rims shown in FIG. 3.
Figure 3:
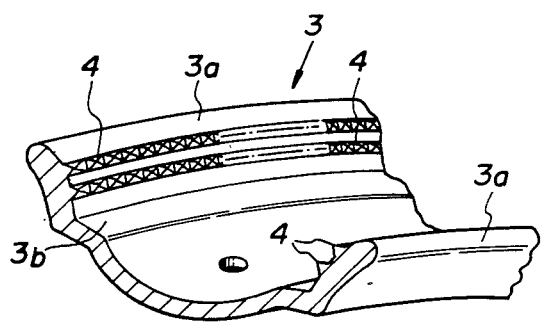
FIG. 3 is a perspective view of a portion of a tire rim in accordance with a first embodiment of the present invention.
Figure 5A:
FIG. 5a is an enlarged perspective view of the projections of the rim shown in FIG. 3.
Figure 5B:
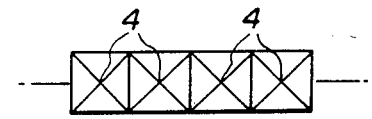
FIG. 5b is a plan view of the projections of the rim shown in FIG. 3.
Figures 6A, 6B, 7, 8, 9:
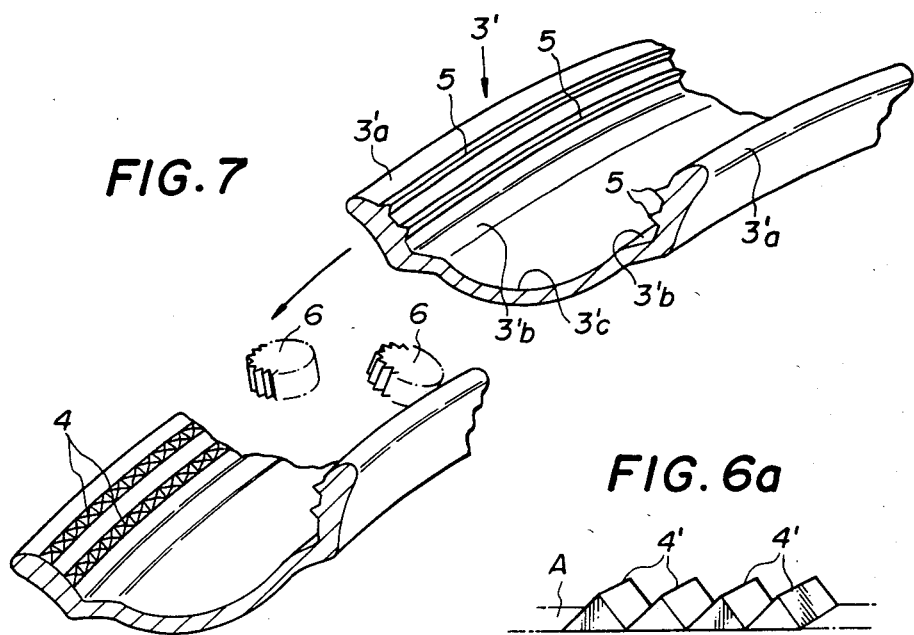

Referring first to FIG. 3, there is shown a first embodiment of the tire rim 3 of the present invention which includes a concave sectional portion bounded on both sides by bead seat portions 3b and outer ear portions 3a having rows of protrusions 4. These tire rims, which are particularly designed for use on motorcycles, are preferably made from an aluminum alloy material. The protrusions (projections) 4, which are illustrated in FIGS. 4, 5a and 5b, have a given height h which is ordinarily much higher than the depth of the indentations of the prior art tire rims, and protrude from the inside wall A of each tire rim ear portion which confronts an opposite one at a distance W equivalent to a space between the outside wall of tire beads. Projections 4 may be pyramid shaped as illustrated in FIG. 5a, triangular prism shaped as illustrated in FIG. 6a, FIG. 8 or sawtooth shaped as illustrated in FIG. 9. Other shapes are also possible. The projections have common base edges. An important aspect of the projection shapes is that they have sharp upper edges and/or points so that they may bite into the tire to be mounted on the rim. The magnitude of the grip on the tire obtained from the projections may be varied by varying the height and/or sharpness of the projections, the length of each row of projections and the number or rows of projections. Furthermore, the projections may be formed on either the ear portions as illustrated by projections 4 on ear portions 3a in FIG. 3 and prism-shaped projections 5' on ear portions 3'a in FIG. 8 or on the bead seat portions as illustrated by sawtooth projections 5" on bead seat portions 3'b in FIG. 9. Also, the projections 4 in FIG. 3, the projections 4' in FIG. 6a, the projections 5' in FIG. 8, and the projections 5" in FIG. 9, may be formed in rows which extend intermittently around the tire rim. It should also be noted that the prism-shaped projections 4', 5' of FIGS. 6a, 6b, 8 and the sawtooth projections 5" of FIG. 9 are particularly useful in rims having the sharply curved and markedly horizontal and vertical portions illustrated in these figures.

Turning now to FIG. 7, there is illustrated a method for manufacturing the tire rim structures described above. An elongated tire rim structure having a cross-section similar to those shown in FIG. 8 or FIG. 9, having elongated ridges 5 having sharp edged crests (which may be triangular, sawtooth or rectangular shaped, depending on the desired shape of the projections) are formed on the ear portion 3'a by conventional extrusion methods. Then, the elongated member 3' is bent-rolled to a generally cylindrical shape. During the bend-rolling procedure, the ridges 5 are pressed and notched by roller 6 having triangularly shaped teeth. The result obtained when the ridges 5 are triangularly shaped in cross-section as illustrated in FIG. 7 is the pyramid shaped projections 4 shown in FIG. 7. In an alternative method, the rollers 6 may be applied to the ridges 5 prior to member 3' being formed into a cylindrical body.

Also, rather than the above-described rollers 6, grinders or other means may be used to rasp off edges of the ridges 5 in order to obtain the desired projections. Thus, it is apparent that the rims of the present invention can be manufactured with integrally formed projections by an easy to implement modification of conventional methods of manufacturing conventional tire rims.

The tire rim obtained in accordance with the method and structure of the present invention will not, due to the projections which firmly bite into the tire, slip even under the most stressful operating conditions. Thus, in case of puncture, the tire can be prevented from separating from the rim and a serious accident can thus be prevented.

It is to be understood that the above-described embodiments of the present invention are merely illustrative of many possible specific embodiments whose manufacture and structure will be readily apparent to one skilled in the art by whom numerous variations of the invention can be derived without departing from the spirit and scope of the invention which is limited only by the following claims. For example, the projections described to be formed on either the ear portions or the bead seat portions of the tire rim may be located on both of these portions.

We claim:
1. A method of forming a tire rim comprising the steps of:
    (1) forming by extruding from a metal alloy material an elongated member having a concave inner portion and two outer portions including bead seat portions outside said concave portion and ear portions outside said bead portions, said outer portions having a generally smooth outer surface generally in the shape of the outside surface of a tire to be mounted thereon and elongated continuous ridges projecting outwardly from said surface along said outside portions, the ridges being formed by extrusion during said step of extruding;
    (2) notching said ridges to form rows of projections for gripping the tires to be mounted; and
    (3) after said step of notching, bend-rolling said elongated member to a generally cylindrical shape to form an integral tire rim.

2. A method as in claim 1, wherein said step of notching is performed with a toothed roller.

3. A method as in claim 2, wherein said toothed roller comprises generally triangular prism shaped teeth.

4. A method as in claim 1, wherein each of said elongated continuous ridges comprise at least one elongated sharp edge at the crest thereof.

5. A method of forming a tire rim comprising the steps of:
    (1) forming by extruding from a metal alloy material an elongated member having a concave inner portion and two outer portions including bead seat portions outside said concave portion and ear portions outside said bead portions, said outer portions having a generally smooth outer surface generally in the shape of the outside surface of a tire to be mounted thereon and elongated continuous ridges projecting outwardly from said surface along said outside portions, the ridges being formed by extrusion during said step of extruding;
    (2) bend-rolling said elongated member to a generally cylindrical shape; and
    (3) after said step of bend-rolling, notching said ridges to form rows of projections for gripping the tires to be mounted to form an integral tire rim.

6. A method as in claim 5, wherein said step of notching is performed with a toothed roller.

7. A method as in claim 6, wherein said toothed roller comprises generally triangular prism shaped teeth.

8. A method as in claim 5, wherein each of said elongated continuous ridges comprise at least one elongated sharp edge at the crest thereof.

* * * * *